United States Patent
Ngo et al.

(10) Patent No.: US 8,111,654 B2
(45) Date of Patent: *Feb. 7, 2012

(54) SYSTEM AND METHOD FOR WIRELESS COMMUNICATION OF UNCOMPRESSED VIDEO HAVING ACKNOWLEDGEMENT (ACK) FRAMES

(75) Inventors: Chiu Ngo, San Francisco, CA (US); Harkirat Singh, Santa Clara, CA (US); Huai-Rong Shao, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 822 days.

This patent is subject to a terminal disclaimer.

(21) Appl. No.: 11/726,056

(22) Filed: Mar. 20, 2007

(65) Prior Publication Data
US 2008/0037465 A1   Feb. 14, 2008

Related U.S. Application Data

(60) Provisional application No. 60/836,903, filed on Aug. 9, 2006.

(51) Int. Cl.
*H04W 4/00* (2009.01)

(52) U.S. Cl. ........ 370/329; 370/334; 370/339; 370/349; 370/389; 709/236

(58) Field of Classification Search .................. 370/329, 370/339, 334, 389, 349
See application file for complete search history.

(56) References Cited

U.S. PATENT DOCUMENTS

| | | | |
|---|---|---|---|
| 5,224,105 A * | 6/1993 | Higley | 714/748 |
| 5,636,251 A | 6/1997 | Citta et al. | |
| 7,020,121 B2 | 3/2006 | Hardacker et al. | |
| 7,039,068 B1 | 5/2006 | Halasz | |
| 7,073,079 B1 * | 7/2006 | Karsi et al. | 713/320 |
| 7,304,975 B2 * | 12/2007 | Shvodian | 370/338 |

(Continued)

FOREIGN PATENT DOCUMENTS

JP   2004-064271   2/2004

OTHER PUBLICATIONS

Distributed Medium Access Control (MAC) for wireless networks, WiMedia Alliance, Draft 0.99, Nov. 1, 2005.

(Continued)

*Primary Examiner* — Jinsong Hu
*Assistant Examiner* — Qun Shen
(74) *Attorney, Agent, or Firm* — Kenneth L. Sherman, Esq.; Michael Zarrabian, Esq.; Myers Andras Sherman & Zarrabian LLP

(57) ABSTRACT

A wireless communication system and method for wireless communication are disclosed. One embodiment of the system includes a wireless communication device. The device includes a receiver configured to receive a data packet via a channel. The device further includes a transmitter configured to send an acknowledgment (ACK) signal via a low-rate channel upon receiving the data packet. The low-rate channel has a directional mode and an omni-directional mode. The acknowledgment signal includes a low-rate physical layer (LRP) preamble and an acknowledgment (ACK) header including a mode index field. The mode index field includes a plurality of bits indicative of whether the ACK signal is transmitted using the directional mode or the omni-directional mode.

20 Claims, 12 Drawing Sheets

U.S. PATENT DOCUMENTS

| | | | |
|---|---|---|---|
| 2002/0002708 A1* | 1/2002 | Arye | 725/95 |
| 2002/0164968 A1* | 11/2002 | Crawford | 455/277.1 |
| 2002/0181492 A1 | 12/2002 | Kasami et al. | |
| 2003/0039226 A1 | 2/2003 | Kwak | |
| 2003/0179707 A1 | 9/2003 | Bare | |
| 2003/0214930 A1 | 11/2003 | Fischer | |
| 2004/0156354 A1 | 8/2004 | Wang et al. | |
| 2004/0258092 A1* | 12/2004 | Sugaya | 370/474 |
| 2005/0111451 A1* | 5/2005 | Kim | 370/389 |
| 2005/0136990 A1 | 6/2005 | Hardacker et al. | |
| 2005/0165950 A1* | 7/2005 | Takagi et al. | 709/236 |
| 2005/0195858 A1* | 9/2005 | Nishibayashi et al. | 370/474 |
| 2005/0265297 A1* | 12/2005 | Nakajima et al. | 370/338 |
| 2005/0285803 A1 | 12/2005 | Iacono et al. | |
| 2006/0034317 A1 | 2/2006 | Hong et al. | |
| 2006/0056300 A1 | 3/2006 | Tamura et al. | |
| 2006/0056345 A1 | 3/2006 | Marinier et al. | |
| 2006/0089144 A1* | 4/2006 | Kim et al. | 455/439 |
| 2006/0109813 A1* | 5/2006 | Saito et al. | 370/329 |
| 2006/0111129 A1* | 5/2006 | Ihm et al. | 455/466 |
| 2006/0229075 A1* | 10/2006 | Kim et al. | 455/436 |
| 2007/0234170 A1 | 10/2007 | Shao et al. | |
| 2007/0286103 A1 | 12/2007 | Niu et al. | |
| 2007/0288980 A1 | 12/2007 | Niu et al. | |
| 2008/0002650 A1 | 1/2008 | Xia et al. | |
| 2008/0037466 A1* | 2/2008 | Ngo et al. | 370/329 |
| 2008/0045149 A1* | 2/2008 | Dharmaraju et al. | 455/39 |
| 2008/0056393 A1 | 3/2008 | Niu et al. | |

OTHER PUBLICATIONS

High-Definition Multimedia Interface (HDMI) Specifications version 1.2, Aug. 22, 2005.

IEEE 802.15.3 Working Group. Part 15.3: Wireless medium access control (MAC) and physical layer (PHY) specifications for high rate wireless personal area networks (WPAN). IEEE Draft Standard, Draft P802.15.3/D16, Feb. 2003.

International Search Report dated Oct. 17, 2007 (International Application No. PCT/KR2007/003347).

Maruhashi et al., "Wireless uncompressed-HDTV-signal transmission system utilizing compact 60-GHz-band transmitter and receiver," Microwave Symposium Digest, 2005 IEEE MTT-S International, Jun. 12-17, 2005.

Hachman, "CE Giants back Amimon's Wireless HDTV Tech," PCMAG.com, 1 page (Jul. 23, 2008).

"NEC develops compact millimeter-wave transceiver for uncompressed HDTV signal transmission," *NE Asia Online*, Apr. 5, 2005, (Downloaded from http://neasia.nikkeibp.com/topstory/000913 on Sep. 29, 2006.).

WirelessHD Specification Version 1.0 Overview, Oct. 9, 2007, 77 pages.

FreshNews.com, SiBEAM Receives Equity Investment from Best Buy, http://freshnews.com/print/node/261440, Jan. 4, 2010, 2 pages.

IEEE 802.15.3™ Standard for Information Technology—Telecommunications and information exchange between systems—Local and metropolitan area networks—Specific requirements, Part 15.3: Wireless Medium Access Control (MAC) and Physcial Layer (PHY) Specifications for High Rate Wireless Personal Area Networks (WPANs), IEEE Std 802.15.3-2003, IEEE Computer Society, Sep. 29, 2003, pp. 1-324.

IEEE P802.11n™ /D1.0, "Draft Amendment to Standard [FOR] Information Technology—Telecommunications and information exchange between systems—Local and Metropolitan networks—Specific requirements-Part 11: Wireless LAN Medium Access Control (MAC) and Physical Layer (PHY) specifications: Enhancements for Higher Throughput," IEEE , Mar. 2006.

Kim, "FEC and Data Reordering," WiHD Osaka Conference, Apr. 25, 2006.

Van Veen et al., Beamforming: A Versatile Approach to Spatial Filtering, IEEE ASSP Magazine, Apr. 1988, 5: 4-24.

International Preliminary Report on Patentability and Written Opinion dated Feb. 10, 2009 for PCT/KR2007/003347, filed Jul. 10, 2007.

U.S. Office Action dated Nov. 3, 2009 in U.S. Appl. No. 11/726,084, filed Mar. 20, 2007., Nov. 3, 2009.

U.S. Office Action dated Jan. 6, 2010 in U.S. Appl. No. 11/724,856, filed Mar. 16, 2007.

U.S. Office Action dated Apr. 16, 2010 in U.S. Appl. No. 11/724,084, filed Mar. 20, 2007.

European Supplemental Search Report dated Mar. 19, 2010 in European Application No. 07768682.2.

IEEE Std 802.15.3—IEEE Standard for Information Technology—Telecommunications and information exchange between systems—Local and metropolitan area networks—Specific Requirement.s Part 15.3: Wireless Medium Access Control (MAC) and Physical Layer PHY) Specifications for High Rate Wireless Personal Area Networks (WPANs), pp. 111-113, Sep. 29, 2003.

MBOA and WiMedia Alliance—Distributed Medium Access Control (MAC) for Wireless Networks, Draft 0.99, p. 78, Nov. 1, 2005.

IEEE Std 802.11—IEEE Standard for Information Technology—Telecommunications and information exchange between systems—Local and metropolitan area networks—Specific Requirement.s Part 11: Wireless LAN Medium Access Control (MAC) and Physical Layer (PHY) Specifications, p. 74, Jun. 12, 2007.

Caetano, Lianne, SiBeam-60 GHz Architecture for Wireless Video Display, Mar. 2006.

European Office Action dated Mar. 31, 2010 for European Application No. 07768682, European Patent Office, pp. 1-3, Berlin, Germany.

Korean Notice of Allowance dated Nov. 9, 2009 for Korean Application No. 10-2008-7007945, Korean Intellectual Property Office, pp. 1-3, Seo-gu, Daejeon, Republic of Korea.

Korean Office Action dated May 25, 2009 for Korean Application No. 10-2008-7007945, Korean Intellectual Property Office, pp. 1-4, Seo-gu, Daejeon, Republic of Korea.

Notification of Transmittal of the International Search Authority, International Search Report and Written Opinion dated Oct. 17, 2007 for International Application No. PCT/KR2007/003347 from Korean Intellectual Property Office, pp. 1-11, Seo-gu, Daejeon, Republic of Korea.

\* cited by examiner

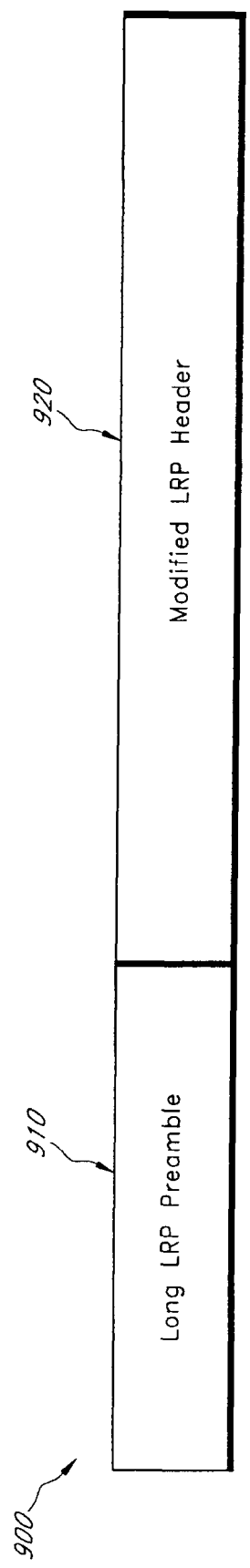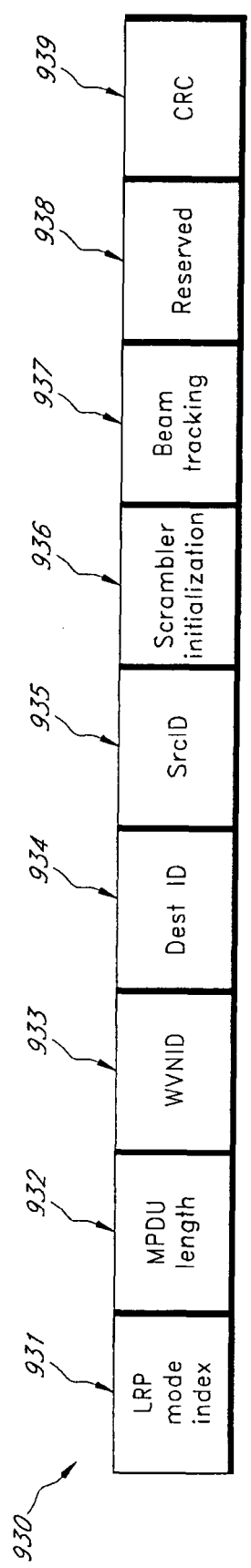
FIG. 9A
FIG. 9B

SYSTEM AND METHOD FOR WIRELESS COMMUNICATION OF UNCOMPRESSED VIDEO HAVING ACKNOWLEDGEMENT (ACK) FRAMES

CROSS-REFERENCE TO RELATED APPLICATIONS

This application claims priority from U.S. Provisional Patent Application No. 60/836,903, filed on Aug. 9, 2006, the disclosure of which is incorporated herein by reference. This application is related to U.S. application Ser. No. 11/726,084, filed Mar. 20, 2007, published as U.S. Patent Application Publication No. 2008/0037466, entitled SYSTEM AND METHOD FOR WIRELESS COMMUNICATION OF UNCOMPRESSED VIDEO HAVING ACKNOWLEDGMENT (ACK) FRAMES (Inventors: Chiu Ngo, Harkirat Singh, and Huai-Rong Shao, the disclosure of which is incorporated herein by reference.

BACKGROUND OF THE INVENTION

1. Field of the Invention

The present invention relates to wireless transmission of video information, and in particular, to transmission of uncompressed high definition video information over wireless channels.

2. Description of the Related Technology

With the proliferation of high quality video, an increasing number of electronic devices, such as consumer electronic devices, utilize high definition (HD) video which can require about 1 G bps (bits per second) in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be lost and the picture quality can be reduced.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals. Wireless local area network (WLAN) and similar technologies can suffer interference issues when several devices are connected which do not have the bandwidth to carry the uncompressed HD signals.

Transfer of uncompressed video signals requires more use of wireless channels than that of compressed video signals because of a higher volume of data being transferred. Thus, there is a need to provide a system and a method which allow an efficient use of wireless channels while enhancing the accuracy and quality of data being transferred.

SUMMARY OF CERTAIN INVENTIVE ASPECTS

One aspect of the invention provides a wireless communication device. The device comprises: a receiver configured to receive a data packet via a channel; and a transmitter configured to send an acknowledgment (ACK) signal via a low-rate channel upon receiving the data packet, the low-rate channel having a directional mode and an omni-directional mode, the acknowledgment signal comprising: a low-rate physical layer (LRP) preamble; and an acknowledgment (ACK) header comprising a mode index field, the mode index field comprising a plurality of bits indicative of whether the ACK signal is transmitted using the directional mode or the omni-directional mode.

The acknowledgment signal may not include a media access control (MAC) header. The plurality of bits may be made up of 3 bits. The LRP preamble may be a short LRP preamble which lasts about 2 μs to about 10 μs. The LRP preamble may be a long LRP preamble which lasts about 30 μs to about 70 μs.

The LRP preamble may comprise one or more fields selected from: automatic gain control, signal detect, coarse frequency offset compensation, fine frequency offset compensation, timing recovery, receive diversity training, and channel estimation. The ACK header may further comprise an ACK bitmap indicative of the status of the data packet. The data packet may comprise a plurality of sub-packets, and the ACK bitmap may include a plurality of bits, each of the ACK bitmap bits being indicative of the status of one of the sub-packets. The ACK header may further comprise a CRC field.

The receiver may be configured to receive the data packet via one of a high-rate channel and a low-rate channel. The device may be configured to use time division duplexing (TDD). The device may be configured to use frequency division duplexing (FDD). The transmitter may comprise a physical layer, the physical layer being configured to generate the acknowledgment signal. The acknowledgment signal may not include data indicative of an ACK signal destination, an ACK signal source, and a network to which the wireless communication device belongs.

Another aspect of the invention provides an audiovisual device comprising: the device described above; and electronic circuitry configured to process audiovisual data from a video data source.

Yet another aspect of the invention provides a wireless communication device comprising: means for receiving a data packet over a channel; and means for sending an acknowledgment (ACK) signal via a low-rate channel upon receiving the data packet, the low-rate channel having a directional mode and an omni-directional mode, the acknowledgment signal comprising: a low-rate physical layer (LRP) preamble; and an acknowledgment (ACK) header comprising a mode index field, the mode index field comprising a plurality of bits, the plurality of bits being indicative of whether the ACK signal is transmitted using the directional mode or the omni-directional mode.

Yet another aspect of the invention provides a method of wireless communication for uncompressed video data, the method comprising: receiving a data packet over a channel; and sending an acknowledgment (ACK) signal over a low-rate channel after receiving the data packet, the low-rate channel having a directional mode and an omni-directional mode, the acknowledgment signal comprising: a low-rate physical layer (LRP) preamble; and an acknowledgment (ACK) header comprising a mode index field, the mode index field comprising a plurality of bits, the plurality of bits being indicative of whether the ACK signal is transmitted using the directional mode or the omni-directional mode.

Receiving the data packet may comprise using a high-rate channel and/or a low-rate channel. The plurality of bits may be made up of 3 bits. The LRP preamble may be a short LRP preamble which lasts about 2 μs to about 10 μs. The LRP preamble may be a long LRP preamble which lasts about 30 μs to about 70 μs. The LRP preamble may comprise one or more fields selected from: automatic gain control, signal detect, coarse frequency offset compensation, fine frequency offset compensation, timing recovery, receive diversity training, and channel estimation.

The ACK header may further comprise an ACK bitmap indicative of the status of the data packet. The data packet may comprise a plurality of sub-packets, and the ACK bitmap may include a plurality of bits, each of the ACK bitmap bits being indicative of the status of one of the sub-packets. The ACK header may further comprise a CRC field.

Another aspect of the invention provides a wireless communication device comprising: a receiver configured to receive a data packet over a channel; and a transmitter configured to send an acknowledgment (ACK) signal via a low-rate channel in an omni-directional mode upon receiving the data packet, the acknowledgment signal comprising: a long low-rate physical layer (LRP) preamble; a long low-rate physical layer (LRP) header comprising a plurality of bits, the plurality of bits comprising at least one bit indicative of at least one of an ACK signal destination, an ACK signal source, and a network to which the wireless communication device belongs; and a cyclic redundancy check (CRC) field. The at least one bit may be indicative of whether there is no specific destination.

Another aspect of the invention provides a wireless communication device for use with the wireless communication device described above. The device comprises: a receiver configured to receive the ACK signal over the low-rate channel; and a processor configured to determine whether to process data in the CRC field of the ACK signal, based on the at least one bit.

Yet another aspect of the invention provides an audiovisual device, comprising: the wireless communication device described above; and electronic circuitry configured to process audiovisual data from a video data source.

Another aspect of the invention provides a wireless communication device comprising: means for receiving a data packet via a channel; and means for sending an acknowledgment (ACK) signal via a low-rate channel in an omni-directional mode upon receiving the data packet, the acknowledgment signal comprising: a long low-rate physical layer (LRP) preamble; a long low-rate physical layer (LRP) header comprising a plurality of bits, the plurality of bits comprising at least one bit indicative of at least one of an ACK signal destination, an ACK signal source, and a network to which the wireless communication device belongs; and a cyclic redundancy check (CRC) field.

Another aspect of the invention provides a method of wireless communication for uncompressed video data. The method comprises: receiving a data packet over a channel; and sending an acknowledgment (ACK) signal over a low-rate channel in an omni-directional mode after receiving the data packet, the acknowledgment signal comprising: a long low-rate physical layer (LRP) preamble; a long low-rate physical layer (LRP) header comprising a plurality of bits, the plurality of bits comprising at least one bit indicative of at least one of the ACK signal destination, the ACK signal source, and a network to which the wireless communication device belongs; and a cyclic redundancy check (CRC) field. The at least one bit may be indicative of whether there is no specific destination. The method may further comprise receiving the ACK signal over the low-rate channel; and determining whether to process data in the CRC field of the ACK signal, based on the at least one bit.

BRIEF DESCRIPTION OF THE DRAWINGS

FIG. 9A is a timeline for omni-directional acknowledgment (ACK), according to yet another embodiment.

FIG. 9B is a timeline for the modified LRP header of FIG. 9A, according to one embodiment.

DETAILED DESCRIPTION OF CERTAIN INVENTIVE EMBODIMENTS

Figure 1:
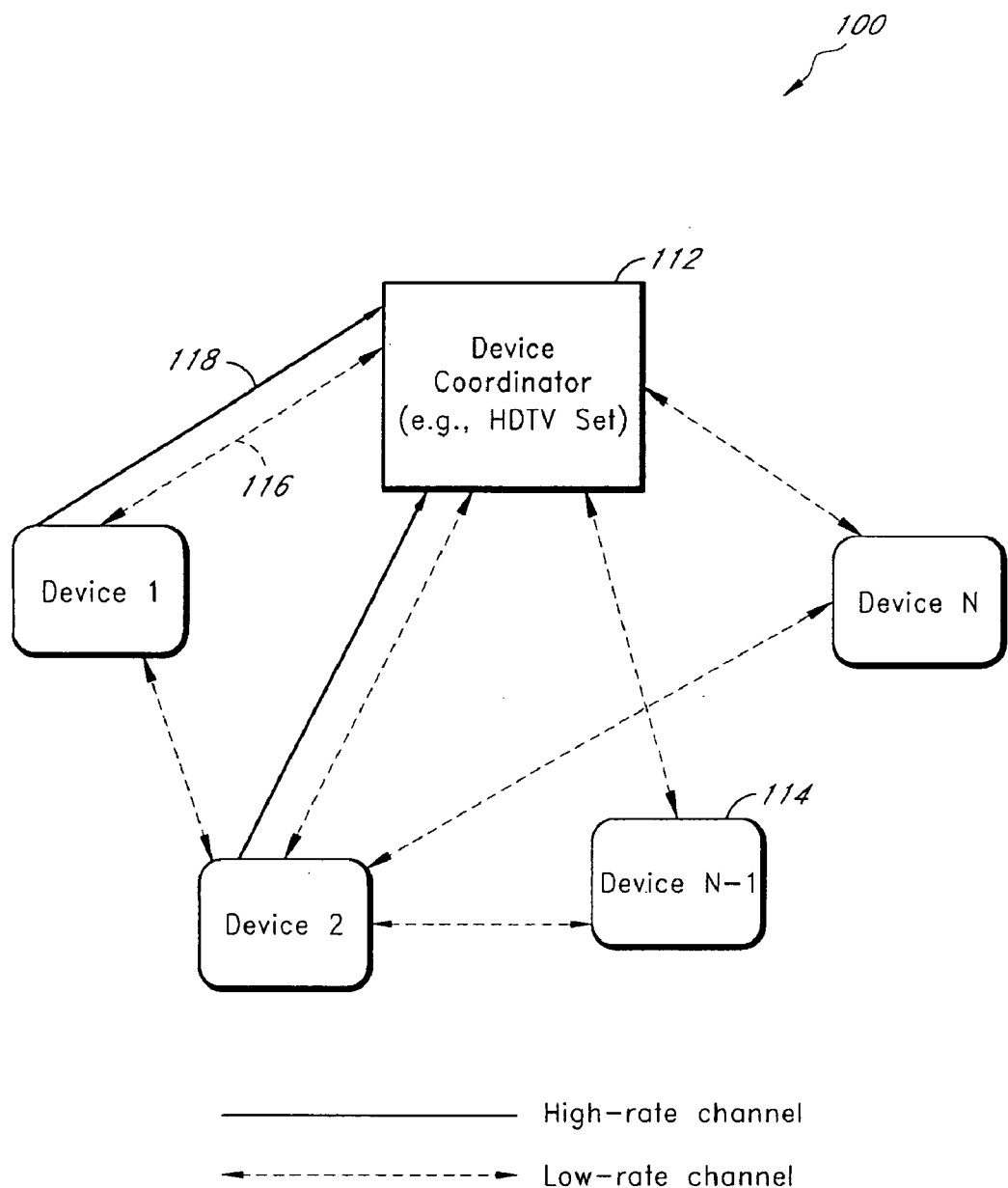
FIG. 1 is a functional block diagram of a wireless network that implements uncompressed HD video transmission between wireless devices, according to one embodiment of the system and method.

Various aspects and features of the invention will become more fully apparent from the following description and appended claims taken in conjunction with the foregoing drawings. In the drawings, like reference numerals indicate identical or functionally similar elements.

Certain embodiments provide a method and system for transmission of uncompressed HD video information from a sender to a receiver over wireless channels. Example implementations of the embodiments in a wireless high definition (HD) audio/video (A/V) system will now be described.

FIG. 1 shows a functional block diagram of a wireless network 100 that implements uncompressed HD video transmission between A/V devices such as an A/V device coordinator and A/V stations, according to certain embodiments. In other embodiments, one or more of the devices can be a computer, such as a personal computer (PC). The network 100 includes a device coordinator 112 and multiple A/V stations 114 (e.g., Device 1 . . . Device N).

The A/V stations 114 utilize a low-rate (LR) wireless channel 116 (dashed lines in FIG. 1), and may use a high-rate (HR) channel 118 (heavy solid lines in FIG. 1), for communication between any of the devices. The device coordinator 112 uses a low-rate channel 116 and a high-rate wireless channel 118, for communication with the stations 114. Each station 114 uses the low-rate channel 116 for communications with other stations 114. The high-rate channel 118 supports single direction unicast transmission over directional beams established by beamforming, with e.g., multi-GB/s bandwidth, to support uncompressed HD video transmission. For example, a set-top box can transmit uncompressed video to a HD television (HDTV) over the high-rate channel 118. The low-rate channel 116 can support bi-directional transmission, e.g., with up to 40 Mbps throughput in certain embodiments. The low-rate channel 116 is mainly used to transmit control frames such as acknowledgment (ACK) frames. For example, the low-rate channel 116 can transmit an acknowledgment from the HDTV to the set-top box. It is also possible that some low-rate data like audio and compressed video can be transmitted on the low-rate channel between two devices directly. Time division duplexing (TDD) is applied to the high-rate and low-rate channel. At any one time, the low-rate and high-rate channels cannot be used in parallel for transmission, in certain embodiments. Beamforming technology can be used in both low-rate and high-rate channels. The low-rate channels can also support omni-directional transmissions.

In one example, the device coordinator 112 is a receiver of video information (hereinafter "receiver 112"), and the station 114 is a sender of the video information (hereinafter "sender 114"). For example, the receiver 112 can be a sink of video and/or audio data implemented, such as, in an HDTV set in a home wireless network environment which is a type of WLAN. The sender 114 can be a source of uncompressed video or audio. Examples of the sender 114 include a set-top box, a DVD player or recorder, digital camera, camcorder, and so forth.

Figure 2:
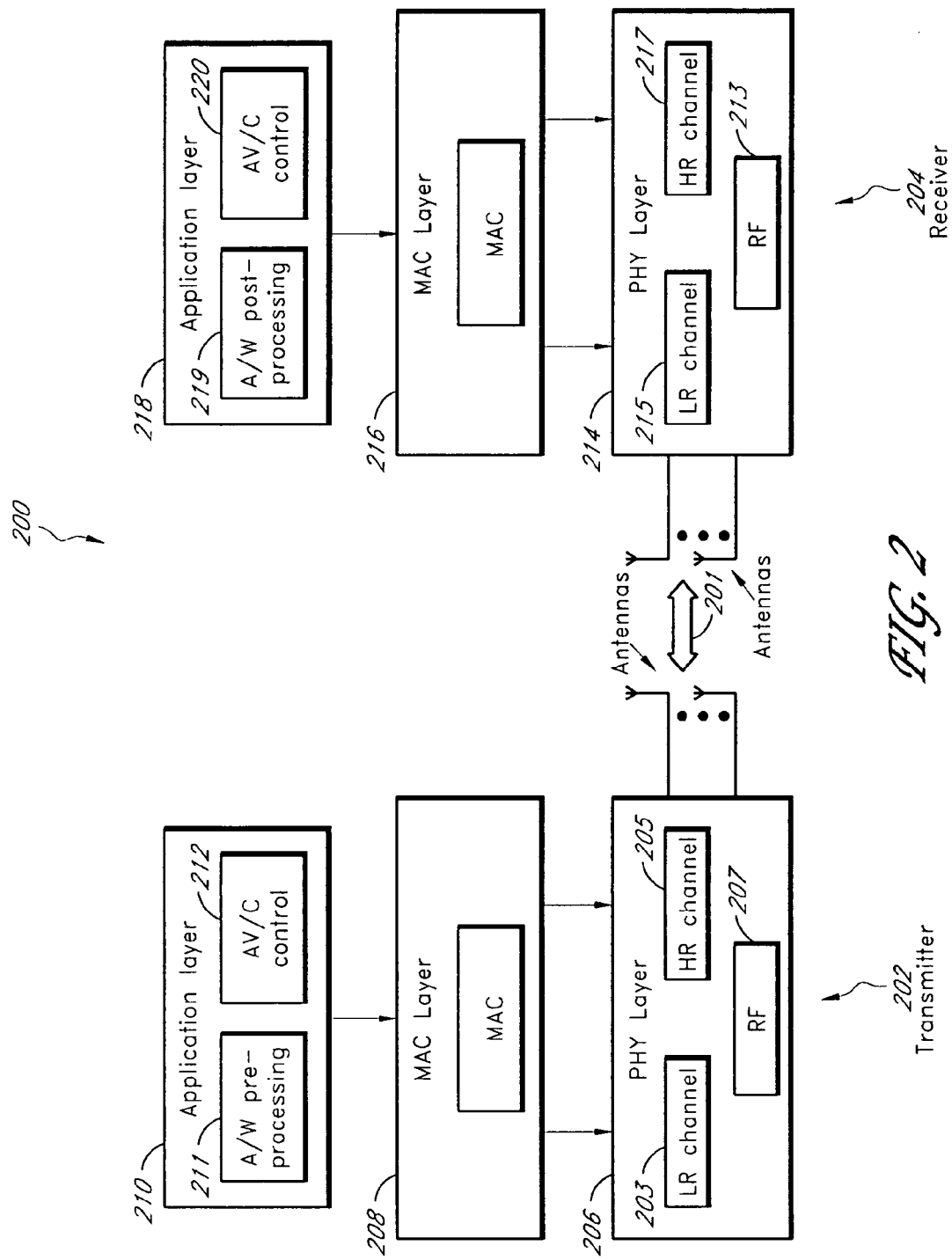
FIG. 2 is a functional block diagram of an example communication system for transmission of uncompressed HD video over a wireless medium, according to one embodiment of the system and method.

FIG. 2 illustrates a functional block diagram of an example communication system 200. The system 200 includes a wireless transmitter 202 and wireless receiver 204. The transmitter 202 includes a physical (PHY) layer 206, a media access control (MAC) layer 208 and an application layer 210. Similarly, the receiver 204 includes a PHY layer 214, a MAC layer 216, and an application layer 218. The PHY layers provide wireless communication between the transmitter 202 and the receiver 204 via one or more antennas through a wireless medium 201.

The application layer 210 of the transmitter 202 includes an A/V pre-processing module 211 and an audio video control (AV/C) module 212. The A/V pre-processing module 211 can perform pre-processing of the audio/video such as partitioning of uncompressed video. The AV/C module 212 provides a standard way to exchange A/V capability information. Before a connection begins, the AV/C module negotiates the A/V formats to be used, and when the need for the connection is completed, AV/C commands are used to stop the connection.

In the transmitter 202, the PHY layer 206 includes a low-rate (LR) channel 203 and a high rate (HR) channel 205 that are used to communicate with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216, process the received packets. The PHY layer 214 includes a RF module 213 connected to the one or more antennas. A LR channel 215 and a HR channel 217 are used to communicate with the MAC layer 216 and with the RF module 213. The application layer 218 of the receiver 204 includes an A/V post-processing module 219 and an AV/C module 220. The module 219 can perform an inverse processing method of the module 211 to regenerate the uncompressed video, for example. The AV/C module 220 operates in a complementary way with the AV/C module 212 of the transmitter 202.

Figure 3:
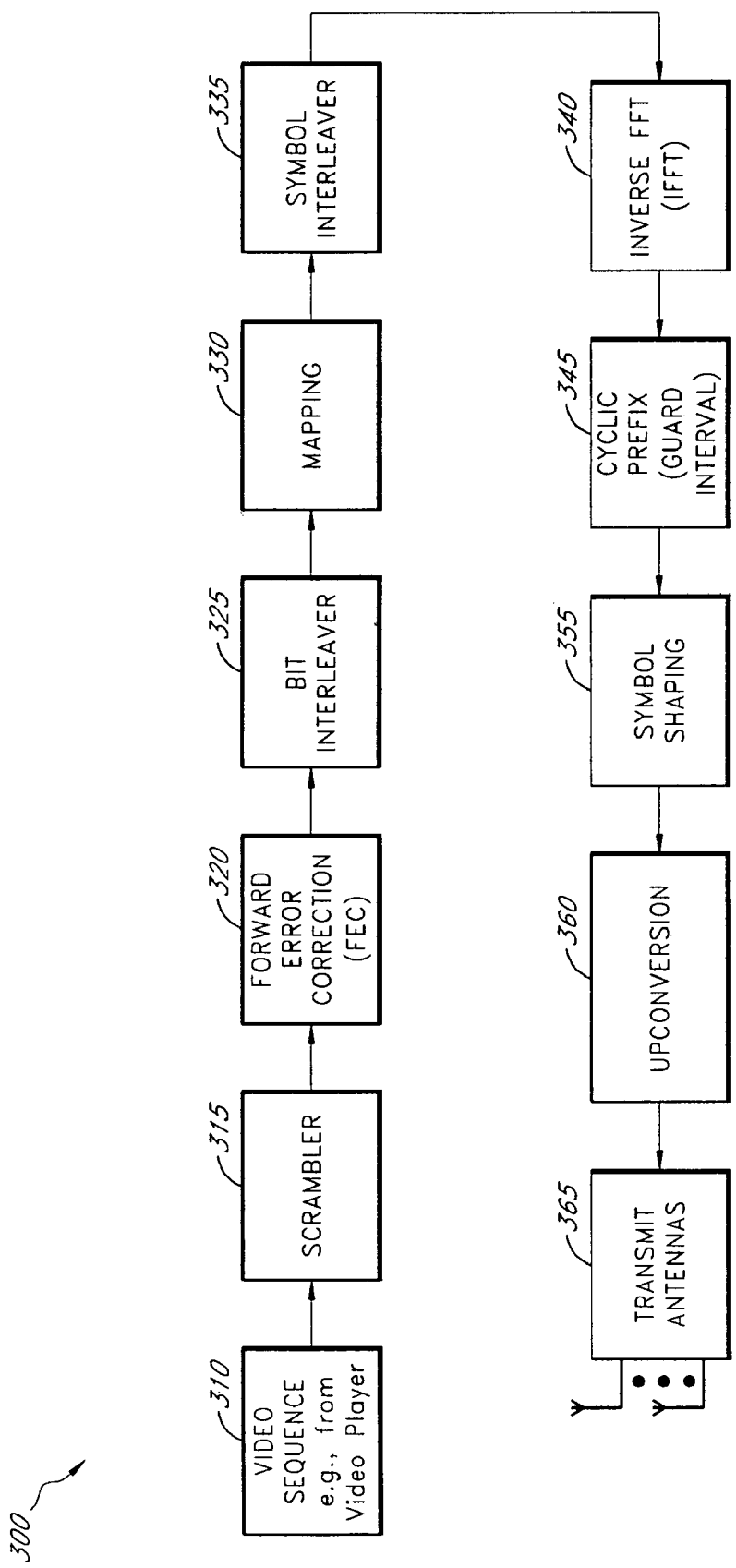
FIG. 3 is a functional block diagram of an example transmitter for transmission of uncompressed HD video over a wireless medium, according to one embodiment of the system and method.

FIG. 3 is a functional block diagram illustrating an example of a transmit chain 300 comprising modules, subsystems or devices, such as used in the PHY block 206 (FIG. 2). It will be appreciated that these modules, subsystems, or devices can be implemented using hardware, software or a combination of both. A video sequence 310 having video data, such as from a video player or other device, is input into a scrambler 315. The scrambler 315 transposes or inverts signals or otherwise encodes data to make the data unintelligible at a receiver not equipped with a corresponding descrambling device. Scrambling is accomplished by the addition of components to the original signal or the changing of some important component of the original signal in order to make extraction of the original signal difficult. Examples of the latter can include removing or changing vertical or horizontal sync pulses in video signals.

A forward error correction (FEC) subsystem 320 receives output from the scrambler and provides protection against noise, interference and channel fading during wireless data transmission. The FEC subsystem 320 adds redundant data to the scrambled video data input to the subsystem. The redundant data allows the receiver to detect and correct errors without asking the transmitter for additional data. In adding redundant data to the video data, the FEC subsystem 320 can use various error correction codes, such as a Reed-Solomon (RS) encoder and a convolutional code (CC) encoder. In other embodiments, the FEC subsystem 320 may use various other encoders, including, but not limited to, a LDPC encoder, a Hamming encoder, and a Bose, Ray-Chaudhuri, Hocquenghem (BCH) encoder.

The output of the FEC 320 is sent to a bit interleaver 325. The bit interleaver 325 rearranges a sequence of data bits received from the FEC 320. The bit interleaver 325 serves to provide further error-protection over video data transmitted over a wireless medium. The output of the bit interleaver 325 is sent to a mapper 330. The mapper 330 maps data bits to complex (IQ) symbols. The complex symbols are used to modulate a carrier for the wireless transmission described above. The mapper 330 can use various modulation schemes, including, but not limited to, Binary Phase-Shift Keying (BPSK), Quadrature Phase-Shift Keying (QPSK), and Quadrature Amplitude Modulation (QAM). In one embodiment, the mapper 330 is a QAM mapper, for example, a 16-QAM mapper or 64-QAM mapper. QAM is a modulation scheme which conveys data by modulating the amplitude of two carrier waves. The two waves, usually two orthogonal sinusoids, are out of phase with each other by 90° and thus are called quadrature carriers. The number, 16 or 64, in front of "QAM" refers to the total number of symbols to which the mapper can map groups of data bits. For example, a 16-QAM mapper converts 4-bit data into $2^4=16$ symbols. Typically, for QAM mappers, a constellation diagram is used for representing the collection of such symbols.

The output of the mapper 330 is sent to a symbol interleaver 335 that rearranges the sequence of complex symbols output from the mapper. The illustrated symbol interleaver 335 is positioned after the mapper 330. In other embodiments, the symbol interleaver 335 may be positioned between the FEC and the mapper 330 in place of the bit interleaver. In such embodiments, the symbol interleaver permutes the predetermined number of bits as a symbol group. For example, in an embodiment where a QAM mapper maps four data bits to a complex symbol, the symbol interleaver is configured to interleave groups of four data bits.

In an embodiment where the symbol interleaver 335 is positioned after the mapper 330, the symbol interleaver rearranges the sequence of the symbols output from the mapper 330. In one embodiment, the symbol interleaver 335 can include a random interleaver which employs a fixed random permutation order and interleaves symbols according to the permutation order. For example, the random interleaver may use Radix-2 FFT (fast fourier transform) operation. In other embodiments, the symbol interleaver 335 can include a block interleaver. A block interleaver accepts a set of symbols and rearranges them without repeating or omitting any of the symbols in the set. The number of symbols in each set is fixed for a given interleaver. The interleaver's operation on a set of symbols is independent of its operation on all other sets of symbols.

The output of the symbol interleaver 335 is sent to an inverse Fast Fourier Transform (IFFT) module 340. The IFFT 340 transforms frequency domain data from the error-correcting, mapping and interleaving modules back into corresponding time domain data. The IFFT module 340 converts a number of complex symbols, which represent a signal in the frequency domain, into the equivalent time domain signal. The IFFT module 340 also serves to ensure that carrier signals produced are orthogonal. The output of the IFFT 340 is sent to a cyclic prefix adder 345 so as to decrease receiver complexity. The cyclic prefix adder 345 may also be referred to as a guard interval inserter. The cyclic prefix adder 345 adds a cyclic prefix interval (or guard interval) to an IFFT-processed signal block at its front end. The duration of such a cyclic prefix interval may be $1/32$, $1/16$, $1/8$, or $1/4$ of the original signal block duration, depending on realistic channel conditions and affordable receiver complexity.

At this point of the transmit chain 300, a preamble is part of the header 310 and prior to the IFFT-processed signal block. Generally, a preamble is selected by the designers of the system 200, such as previously described, and is standardized so that all devices of the system understand it. The use of preamble is to detect start of the packet, estimate various channel parameters, such as symbol timing, carrier frequency offset so that data reception can be done successfully.

A symbol shaping module 355 interpolates and low-pass filters the packet signal generated from the IFFT module 340, the cyclic prefix adder 345 and the preamble. The output of the symbol shaping module 355 is a complex baseband of the output signal of the IFFT module 340. An upconverter 360 upconverts the output of the symbol shaping module 355 to a radio frequency (RF) for possible meaningful transmission. A set of transmit antennas 365 transmit the signal output from the upconverter 360 over a wireless medium, such as the wireless channel 201 (FIG. 2) to a receiver. The transmit antennas 365 can include any antenna system or module suitable for wirelessly transmitting uncompressed HD video signals.

Figure 4:
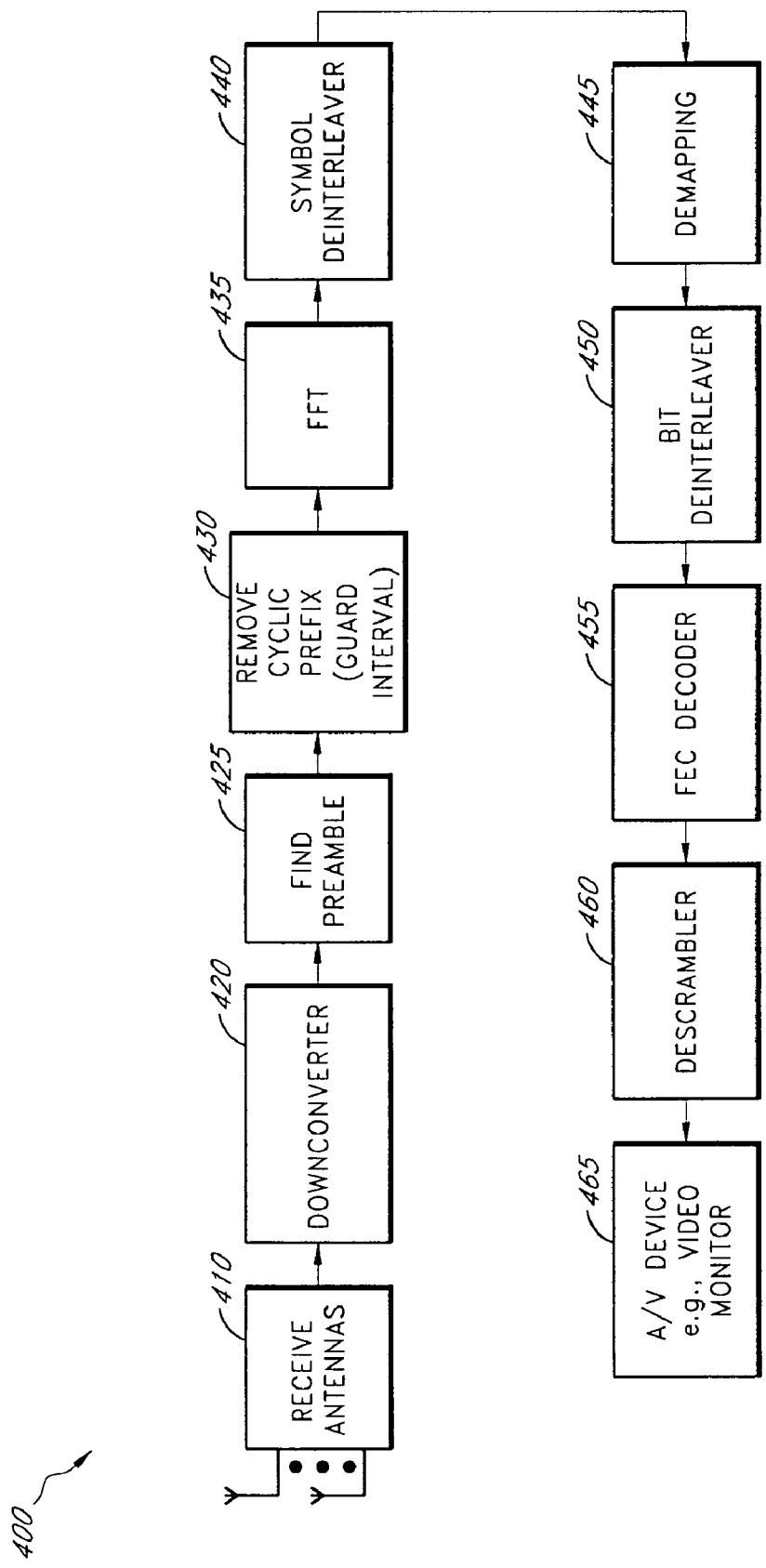
FIG. 4 is a functional block diagram of an example receiver for receipt of uncompressed HD video over a wireless medium, according to one embodiment of the system and method.

FIG. 4 is a functional block diagram illustrating a receiver chain 400 of modules, subsystems or devices, such as used in the PHY block 214 (FIG. 2). The receiver chain 400 generally performs an inverse process of that of the transmitter chain 300 of FIG. 3. The receiver 400 receives an RF signal via the wireless channel 201 (FIG. 2) at receive antennas 410 from the transmit antennas 365 of the transmitter chain 300. A downconverter 415 downconverts the RF signal to a signal of a frequency suitable for processing, or the baseband signal, which is already in the digital domain for easy digital signal processing. A preamble finder 420 then locates a preamble portion of the digital signal, finds the symbol starting timing, estimates the channel coefficients, estimates the carrier frequency offset and tries to compensate it via local processing.

Figure 7:
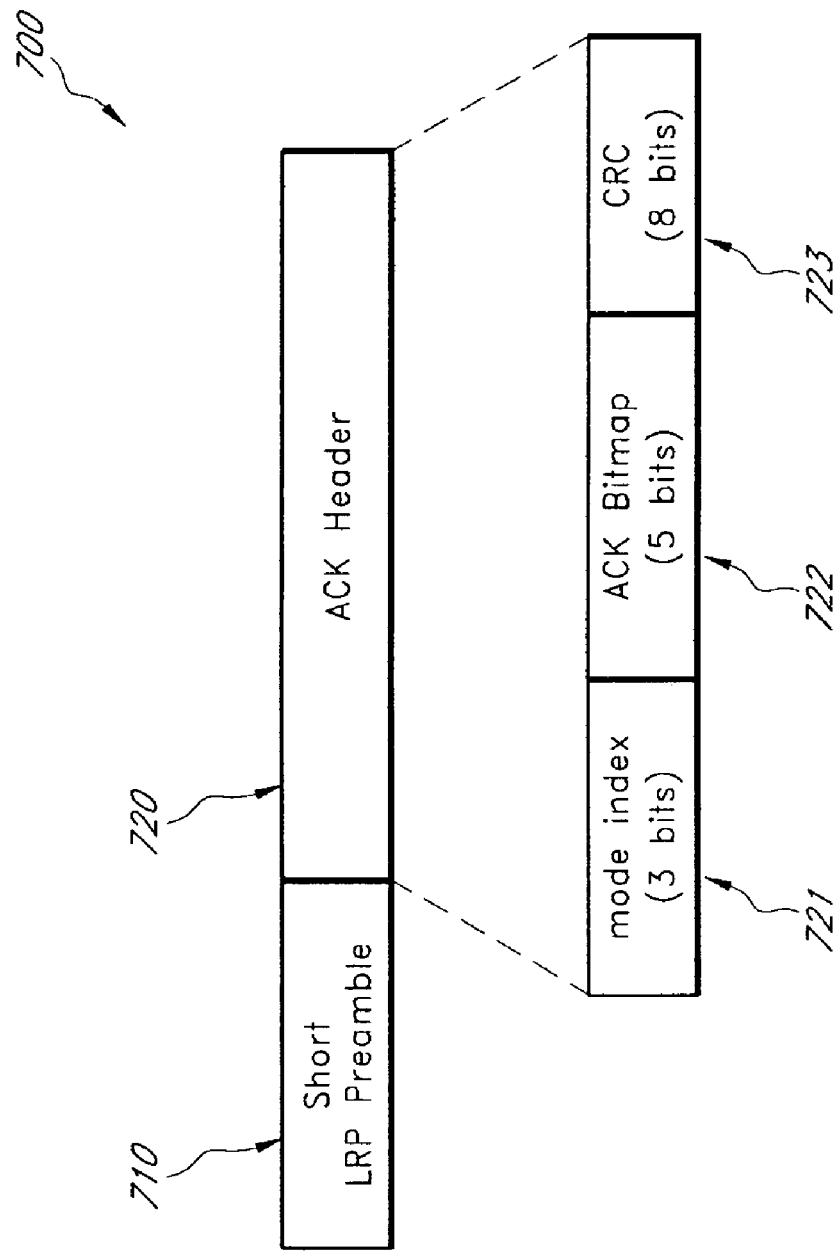
FIG. 7 is a timeline for acknowledgment (ACK), according to one embodiment.

In certain embodiments, the preamble finder 420 includes a correlator and a packet start finding algorithm that can operate on the short training sequences of the preamble (FIGS. 4 and 7). After the preamble is identified by the finder 420, the preamble portion of a current signal packet is sent to a channel estimation, synchronization and timing recovery component 425, which will be further described below. A cyclic prefix remover 430 removes the cyclic prefix from the signal. Next, a fast Fourier transform (FFT) module 435 transforms the signal (a time-domain signal) into a frequency-domain signal. The output of the FFT 435 is used by a symbol deinterleaver 440 which rearranges the FFT output for a demapper 445. The demapper 445 converts the frequency-domain signal (a complex signal) into a bit stream in the time domain. A bit deinterleaver 450 rearranges the bit stream in the original bit stream sequence as before the bit interleaver 325 of FIG. 3.

Subsequently to the bit deinterleaving, a FEC decoder 455 decodes the bit stream, thereby removing redundancy added by the FEC 320 of FIG. 3. In one embodiment, the FEC decoder 455 includes a demultiplexer, a multiplexer, and a plurality of convolutional code (CC) decoders interposed between the demultiplexer and the multiplexer. Finally, a descrambler 460 receives the output from the FEC decoder 455, and then descrambles it, thereby regenerating the video data sent from the transmitter chain 300 of FIG. 3. A video device 465 can now display video using the video data. Examples of the video device include, but are not limited to, a CRT television, an LCD television, a rear-projection television and a plasma display television. It will be appreciated that audio data can also be processed and transmitted in the same manner along with video data by the wireless HD A/V system described above. The audio data can be processed and transmitted using a different wireless transmission scheme. The descrambler 460, FEC decoder 455, bit deinterleaver 450, demapper 445, symbol deinterleaver 440, FFT 435 cyclic prefix remover 430, down-converter 415 and receive antennas 410 of the receiver chain 400 perform analogous but inverse functions of the corresponding scrambler 315, FEC 320, bit interleaver 325, mapper 330, symbol interleaver 335, IFFT 340, cyclic prefix adder 345, upconverter 360 and transmit antennas 365 of the transmit chain 300.

Video signals can be represented by pixel data that encodes each pixel as several values, e.g., using a RGB color model (red, green, and blue), or a YUV (one luminance and two chrominance values). Generally, viewers are more sensitive to transmission errors or loss of data in the most significant bits (MSB) of pixel values than to errors or loss in the least significant bits (LSB) of pixel values. Thus, in one embodiment, the MSB of each pixel value (e.g. 4 out of 8 bits per color channel) is encoded with a different coding and/or modulation scheme than for the remaining LSB of each pixel value.

As described above with reference to FIG. 1, the wireless HD A/V system can include a low-rate (LR) channel and a high-rate (HR) channel according to one embodiment. The two channels operate in time-division duplex (TDD) mode, i.e., only one channel can be activated at any given instance.

Figure 5B:
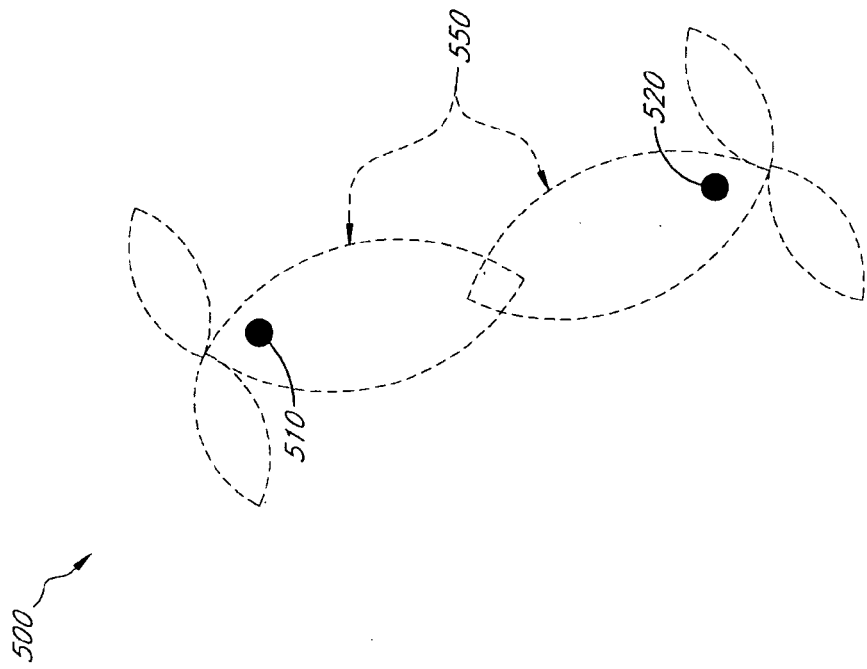
FIG. 5B is a diagram illustrating a high rate (HR) channel for uncompressed HD video transmission, according to one embodiment.
Figure 5A:
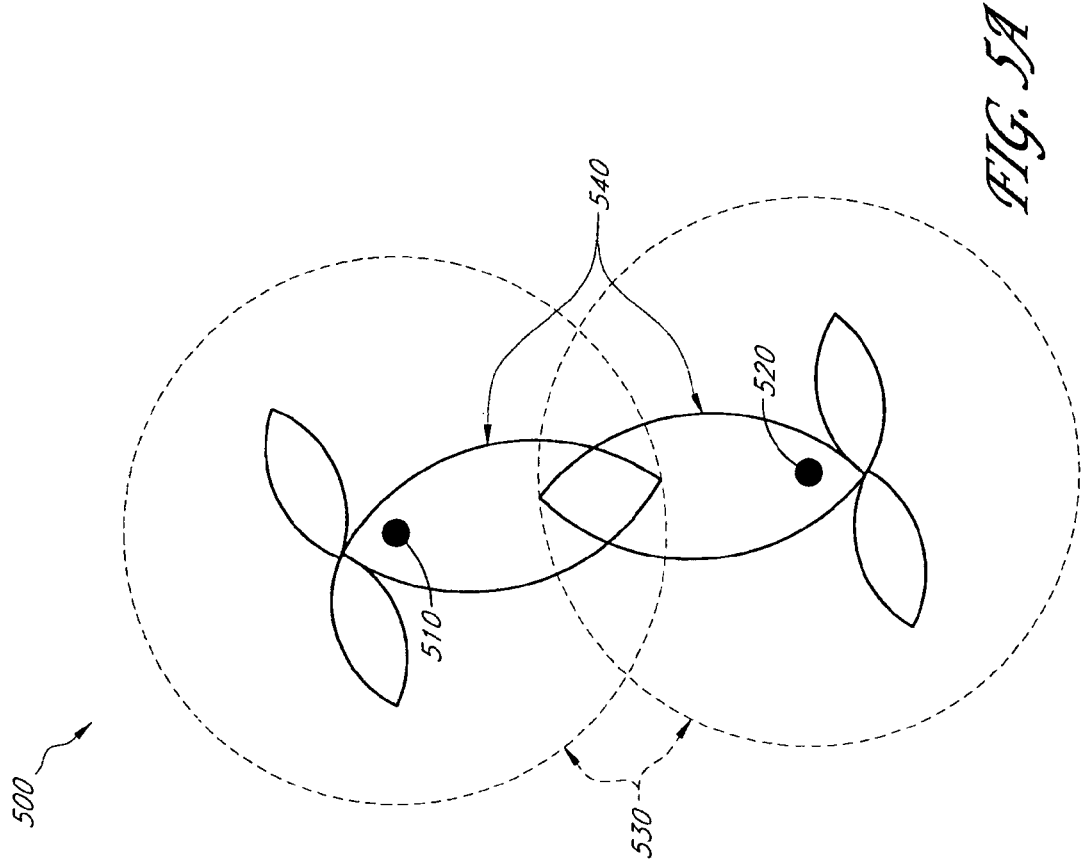
FIG. 5A is a diagram illustrating a low rate (LR) channel for uncompressed HD video transmission, according to one embodiment.

FIG. 5A is a diagram illustrating a low-rate (LR) channel established between two devices in the wireless system 500 according to one embodiment. Examples of the devices include, but are not limited to, a DVD player, an HD television, a home theater device, a media server, a printer, and an overhead projector. The illustrated system 500 includes a display device 510 (e.g., HD television, an overhead projector, etc.) and a video source device 520 (e.g., a set-top box, a DVD player, a VCR, a TiVo® recorder, etc.). In the illustrated embodiment, the video source device 520 is a sender of video data whereas the display device 510 is a receiver. In other embodiments, the video source device 520 may operate as a receiver whereas the display device 510 serves as a sender depending on the direction of data transmission. For example, the display device 510 (e.g., an HD television) may receive broadcast video data and send it to the video source device 520 (e.g., a DVD recorder) for storing the video data.

The LR channel is a symmetric control channel. The LR channel may operate in two modes: omni-directional mode 530 and directional (beam-formed) mode 540.

The omni-directional mode 530 is used for transmission of control data such as beacon, association and disassociation, device discovery, acknowledgment (ACK), and the like. The omni-directional mode 530 can support a data rate of about 2.5 to about 10 Mbps. The omni-directional mode 530 can be established using any suitable omni-directional antennas. The omni-directional antennas are configured to radiate power substantially uniformly in all directions. Examples of the omni-directional antennas include, but are not limited to, a whip antenna, a vertically oriented dipole antenna, a discone antenna, and a horizontal loop antenna.

The directional mode 540 can be used for transmitting low-volume data, for example, audio data. The directional mode 540 may support a data rate of about 20 to about 40 Mbps. The directional mode 540 can be established by forming a beam between the two devices 510, 520 in the system. It will be appreciated that any suitable directional antennas can be adapted for beam-forming. A skilled technologist will appreciate that various communication technologies can be adapted for implementing the directional or omni-directional modes.

FIG. 5B is a diagram illustrating a high-rate (HR) channel 550 established between the two devices 510, 520 in the wireless system 500 according to one embodiment. The HR channel 550 is an asymmetric directional channel. The HR channel 550 can be established by forming a beam between the devices 510, 520. The HR channel 550 can be used for transmission of uncompressed video data from one of the two devices 510, 520 to the other. In one embodiment, video data can be transmitted from the video source device 520 to the display device 510 using this channel 550. The HR channel 550 may support a data rate of about 3 to about 4 Gbps. The packet transmission duration on the HR channel 550 can be about 100 µs to about 300 µs.

In one embodiment, the wireless communication system 500 is configured to wirelessly transmit uncompressed HD television signals. The wireless communication system 500 can use 60 GHz-band mm wave technology to transmit signals at a rate of about 3 to about 4 Gbps. The wireless system 500 can use the high-rate (HR) directional channel for transmitting/receiving HD signals. The system 500 may support 1080$p$ HD formats which requires a raw data rate of 2.98 Gbps (frame size×the number of frames per second=(1920× 1080×3×8)×60).

Figure 6:
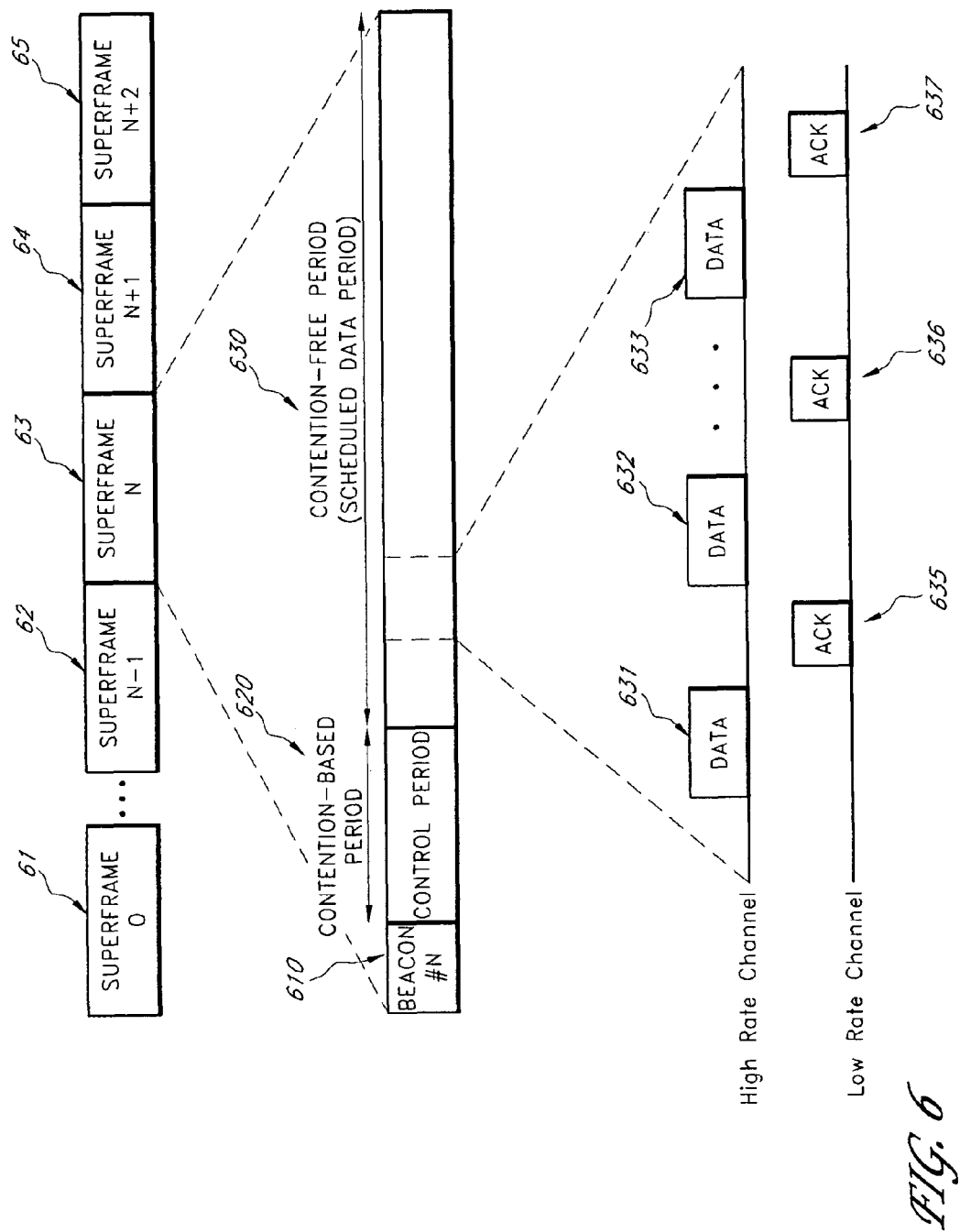
FIG. 6 is a timeline for packet transmission using Time Division Duplex (TDD) scheduling, according to one embodiment.

In one embodiment, the wireless HD A/V system described above can use a data transmission timeline shown in FIG. 6 for communication between two devices in the system. One of the devices in the system can acts as a coordinator which is responsible for managing superframes 61-65, as shown in FIG. 6. In the illustrated embodiment, a video data sender may serve as a coordinator. Each of the superframes 61-65 includes, in sequence, a beacon period 610, a contention-based period (CBP) 620, and a contention-free period (CFP) 630. The contention-based period (CBP) 620 may also be referred to as a "control period." The contention-free period 630 may also be referred to as a "scheduled data period."

During the beacon period 610, the coordinator (or the video data sender in the illustrated embodiment) sends a video data receiver a beacon packet which may contain various timing information. In one embodiment, the timing information may include time allocation information for the contention-based period 620 and the contention-free period 630. The timing information may further include time synchronization information. In one embodiment, the coordinator is configured to periodically transmit the beacon packet over the low-rate channel.

During the contention-based period 620, the video data sender in the system monitors the channels (HR and/or LR channels) and determines if the channel is silent for a predetermined period of time.

Then, the sender transmits data packets to the receiver during the contention-free period 630 which follows the contention-based period 620. The contention-based period may use CSMA or Aloha based MAC (medium access control) protocol. During the contention-free period 630, multiple data packets 631, 632, 633 are transmitted at a predetermined interval over the high-rate channel. The data packets can contain video data. In other embodiments, the data packets may also include audio and control data. In another embodiment, the data packets may include file transfer data and control data.

In one embodiment, after the sender has transmitted data packets 631, 632, 633 to the receiver, the receiver may send acknowledgment signals 635, 636, 637 to the sender upon receiving the data packets. The acknowledgment signals serve to notify the sender of the safe receipt of at least one data packet. In the illustrated embodiment, after receiving each data packet, the receiver sends an acknowledgment signal to the sender before receiving another data packet. The acknowledgment signals can be transmitted over the LR channel.

Acknowledgment (ACK) Frames

In the wireless HD A/V system described above, the two channels (HR and LR channels) operate in time division duplexing (TDD) mode. Thus, the two channels cannot be simultaneously used. Because transmission of uncompressed video signals in the system involves transmission of a high volume of data, there is a need for an efficient use of the channels.

In one embodiment illustrated in FIG. 6, during the contention-free period 630, the high-rate (HR) channel is used for transmission of data packets whereas the low-rate (LR) channel is used for transmission of acknowledgment (ACK) signals. In one embodiment, the ACK signals 635, 636, 637 are configured to have a reduced size to allow more time for the data packets 631, 632, 633.

For example, an ACK frame used in the system does not include a MAC header, thereby reducing its overall ACK frame size. Typically, ACK frames are generated by the MAC layer. Such ACK frames include a MAC header indicating source and destination addresses. In the wireless system described above, an ACK sender includes a physical (PHY) layer which generates ACK frames. In the system, data transmission occurs in scheduled reserved slots or contention-free data periods. For each reserved slot, all devices or stations in the system network know in advance about the sender and the receiver by parsing the beacon frame. Thus, the source and destination addresses are redundant information. Therefore, the ACK frame can include no MAC header, without adversely affecting its operation. This configuration reduces the size of the ACK frame, and minimizes time required for the ACK transmission over the LR channel.

The reduced ACK frame size enhances the availability of the channels. Reducing the ACK size, or the time duration for which the LR channel is busy can provide the HR chancel with more available free time. This extra free time (or available time) on the HR channel can be used for appending some redundancy bits to data packets for error-recovery, or for supporting data re-transmission over the HR channel. In another embodiment, the saved time may be used for supporting more stations in the wireless system. In yet another embodiment, beam-tracking data can be piggybacked onto an ACK frame using the saved time. The beam-tracking data may be used for accurate control of a beam established between the sender and receiver.

In other embodiments, an ACK sender receives data packets via a low-rate channel, and sends an acknowledgment signal via the low-rate channel. The low-rate channel may be in either a directional mode or an omni-directional mode. In one embodiment, when the ACK sender receives data packets in the directional mode, it can transmit a directional acknowledgment signal. In another embodiment, when the ACK sender receives data packets in the omni-directional mode, it can transmit an omni-directional acknowledgment signal. In certain embodiments, an ACK sender may transmit an acknowledgment signal in a directional mode via a high-rate channel. It will be appreciated that various other combinations of data packet and ACK transmission are also possible.

In certain embodiments, the ACK described above can be transmitted out of band. For example, the ACK is transmitted on IEEE 802.11 (at about 2.4 GHz), Bluetooth®, or some other channel which is outside 60 GHz band. In other embodiments, the ACK may be transmitted outside the high-rate (HR) channel band, but still on 60 GHz band. In such embodiments, the system uses frequency division duplex (FDD). It will be appreciated that various other channels and wireless communication technologies can be used for transmitting the ACK.

Referring to FIG. 7, the frame format 700 of an ACK signal according to one embodiment is described below. The illustrated frame format 700 includes in sequence a short low-rate physical layer (LRP) preamble 710 and an ACK header 720.

The short LRP preamble 710 is configured to allow synchronization between an ACK sender (a data packet receiver) and an ACK receiver (a data packet sender) so that the receiver correctly receives a signal from the sender. The short LRP preamble 710 may last about 2 µs to about 10 µs.

The ACK header 720 may include a mode index field 721, an ACK bitmap 722, and a cyclic redundancy check (CRC) field 723. In the illustrated embodiment, the mode index field 721 may include 3 bits. The ACK bitmap 722 may include 5 bits. The CRC field 723 may include 8 bits.

In one embodiment, the mode index field 721 is configured to indicate whether the ACK sender is transmitting an omni-directional ACK signal or a directional ACK signal. For example, the mode index field 721 may have 3 bits which provide eight (8) index values from 0 to 7. Any (e.g., 6) of the index values can be used to indicate that the ACK sender is transmitting an omni-directional ACK. Another (e.g., 7) of the index values may be used to indicate that the ACK sender is transmitting a directional ACK. Other index values may be reserved. An example of the mode index values is shown in Table 1 below.

TABLE 1

| Mode Index | Interpretation |
| --- | --- |
| 1-5 | Used for other purposes |
| 6 | Omni-Directional ACK |
| 7 | Directional ACK |

In certain embodiments, the ACK frame may further include a payload field (not shown). In such embodiments, the index values may serve to indicate coding rates used for the payload field.

The ACK bitmap 722 is configured to indicate the status of a data packet which the ACK sender (data packet receiver) has received from the ACK receiver (data packet sender). In one embodiment, the data packet may include multiple sub-packets. The ACK bitmap 722 may include multiple bits, each indicating the status of one of the sub-packets. For example, if the ACK bitmap is N-bits long, the data packet sender can include N sub-packets in a data packet, and the data packet receiver can indicate which sub-packets have been received correctly.

The CRC field 723 is configured to include a checksum calculated from a block of data in a data packet or sub-packet to detect error during transmission. The checksum is computed and appended by the ACK sender before transmission. Then, the checksum is verified afterwards by the ACK receiver to confirm that no change has occurred during transmission. In the illustrated embodiment, the CRC field 730 includes an eight-bit checksum calculated based on a CRC-8 scheme defined by a polynomial given by Equation 1. It will be appreciated that various configurations of CRC schemes can be adapted for the CRC field 730.

$$x^8+x^2+x+1 \qquad (1)$$

Figure 8A:
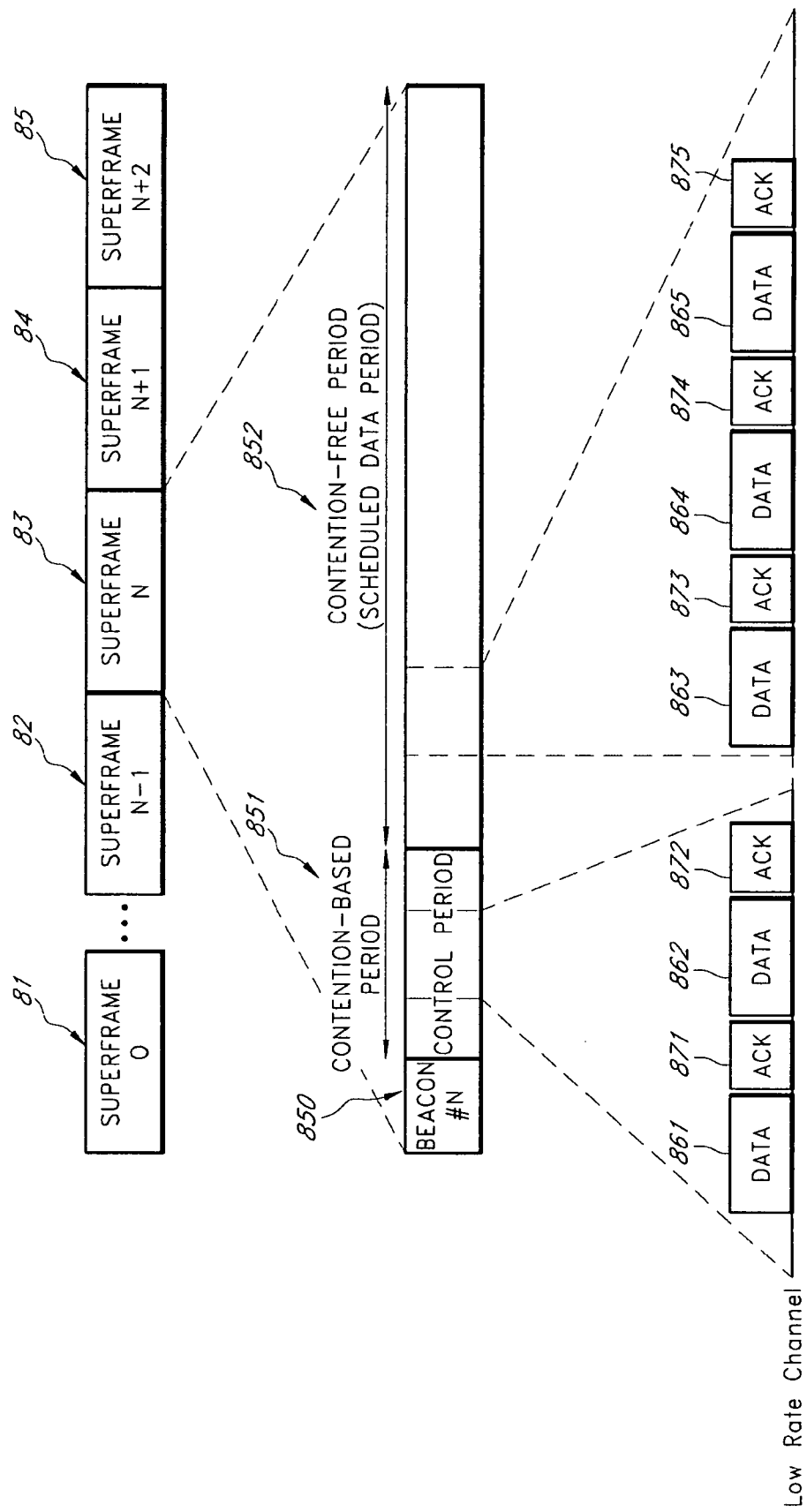
FIG. 8A is a timeline for packet transmission via a low-rate channel in an omni-directional mode using Time Division Duplex (TDD) scheduling, according to one embodiment.

In another embodiment, an ACK sender receives data packets via a low-rate channel, and sends an acknowledgment signal via the low-rate channel. The low-rate channel may be in an omni-directional mode or a directional mode. For example, a wireless HD A/V system can use a data transmission timeline shown in FIG. 8A. One of the devices in the system can manage superframes 81-85 shown in FIG. 8A. Each of the superframes 81-85 includes, in sequence, a beacon period 850, a contention-based period (CBP) 851, and a contention-free period (CFP) 852. The configurations of the beacon period 850, the contention-based period 851, and the contention-free period 852 can be as described above with respect to those of the beacon period 610, the contention-based period 620, and the contention-free period 630 of FIG. 6. In the illustrated embodiment, data 861-865 and ACK signals 871-875 can be transmitted during both contention-based and contention-free periods 851, 852 via a low-rate channel. The ACK signals 871, 872 in the contention-based period 851 may be in the omni-directional mode. The ACK signals 873-875 in the contention-free period 852 may be in either the directional or omni-directional mode.

Figure 8B:
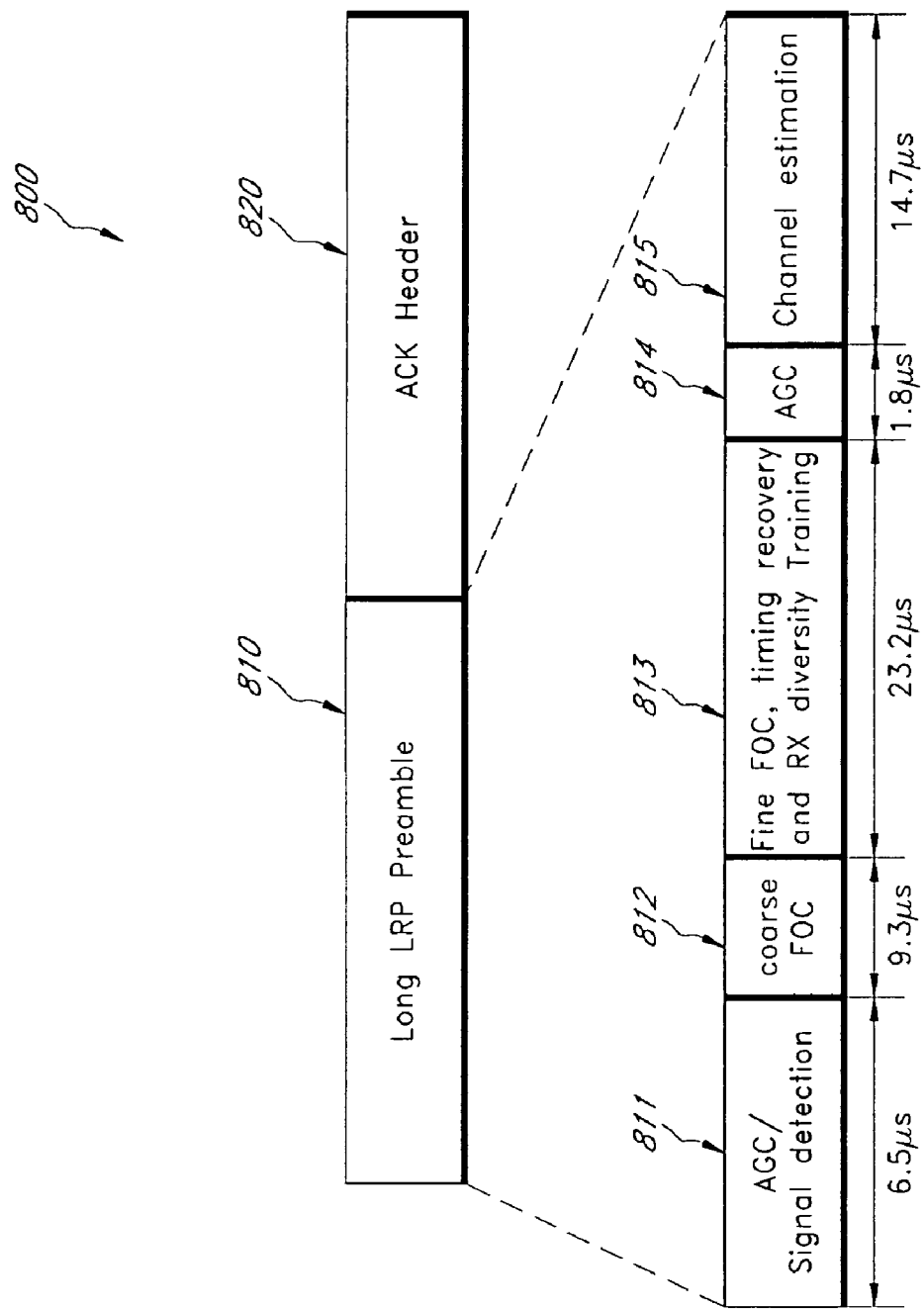
FIG. 8B is a timeline for acknowledgment (ACK), according to another embodiment.

In the illustrated embodiment, the ACK signals can have a long preamble. Referring to FIG. 8B, an ACK frame format 800 for use in the omni-directional mode (low-rate channel) transmission can include a long low-rate physical layer (LRP) preamble 810 and an ACK header 820.

The long LRP preamble 810 is configured to allow synchronization between an ACK sender (a data packet receiver) and an ACK receiver (a data packet sender) so that the receiver correctly receives a signal from the sender. The long LRP preamble 810 may last about 30 µs to about 70 µs. This long LRP preamble 810 is substantially longer than a short LRP preamble which typically lasts about 2 µs to about 10 µs.

As will be better understood from description below, the ACK header 820 is optimized so as to reduce the total length (effective transmission time) of the ACK frame 800. In the illustrated embodiment, the long LRP preamble 810 may have an AGC/signal detection field 811, a coarse frequency offset compensation (FOC) field 812, a fine FOC/timing recovery/receive (RX) diversity training field 813, another AGC field 814, and a channel estimation field 815. The fields 811-815 contain data designed for operations described below. It will be appreciated that various configurations of preambles are also possible.

The automatic gain control (AGC)/signal detection field 811 allows the ACK receiver to detect a signal from the ACK sender. In addition, The automatic gain control (AGC)/signal detection field 811 allows the ACK receiver to maintain adequate performance over a range of input signal levels. During the AGC/signal detection field 811, the ACK receiver is configured to automatically adjust the gain of the ACK receiver to maintain a constant level of output. For example, if the signal is strong, the gain is reduced, and if weak, the gain is increased. In one embodiment, the AGC/signal detection field 811 may last about 6.5 µs. It will be appreciated that the duration of the AGC/signal detection field 811 can vary widely depending on the design of the ACK frame 800.

The coarse frequency offset compensation (FOC) field 812 allows the ACK receiver to adjust a frequency offset due to a frequency shift during signal transmission. In the wireless system described above, uncertainty in carrier frequency occurs due to a difference in the frequencies of the local oscillators in the ACK sender and ACK receiver. This difference gives rise to a shift in the frequency domain. During the coarse FOC field 812, the ACK receiver is allowed to roughly adjust frequency offset. In one embodiment, the coarse FOC field 812 may last about 9.3 µs. It will be appreciated that the duration of the coarse FOC field 812 can vary widely depending on the design of the ACK frame 800.

The fine FOC/timing recovery/receive (RX) diversity training field 813 allows the ACK receiver to fine tune communication with the ACK sender. In this field, the ACK receiver is allowed to perform a fine frequency offset compensation which further adjusts a frequency offset due to a frequency shift during transmission. In addition, the ACK receiver is allowed to perform timing recovery that can be further divided into symbol synchronization and sampling clock synchronization. The purpose of symbol synchronization is to find the correct position of the fast Fourier Transform (FFT) window. The purpose of sampling clock synchronization is to align the ACK receiver sampling clock frequency to that of the ACK sender. During this field, the ACK receiver is also allowed to perform receive diversity training. The receive diversity training adjusts multiple diversity antenna elements, thereby enhancing receipt of signals. In one embodiment, the fine FOC/timing recovery/receive (RX) diversity training field 813 may last about 23.2 µs. It will be appreciated that the duration of the fine FOC/timing recovery/receive (RX) diversity training field 813 can vary widely depending on the design of the ACK frame 800.

The AGC field 814 further allows the ACK receiver to maintain adequate performance over a range of input signal levels. In one embodiment, the AGC field 814 may last about 1.8 µs. It will be appreciated that the duration of the AGC field 814 can vary widely depending on the design of the ACK frame 800.

The channel estimation field 815 is configured to allow the ACK receiver to take into account the effect of channel on the transmitted signal. In one embodiment, the channel estimation field 815 may last about 14.7 µs. It will be appreciated that the duration of the channel estimation field 815 can vary widely depending on the design of the ACK frame 800.

The ACK header 820 may include a mode index field, an ACK bitmap, and a CRC field as described above with respect to the ACK header 720 of FIG. 7. In certain embodiments, the ACK frame 800 may further include a payload field. In such embodiments, the mode index field may include an index value indicative of a coding rate used for the payload field.

FIG. 9A illustrates the frame format 900 of an ACK signal according to another embodiment. The illustrated ACK frame format 900 is for omni-directional ACK. The ACK frame 900 includes a long LRP preamble 910 and a modified LRP header 920. The configuration of the long LRP preamble 910 may be as described above with respect to that of the ACK frame 800 of FIG. 8.

An example of the modified LRP header 930 is shown in FIG. 9B. The modified LRP header 920 includes an LRP mode index 931, a MAC Protocol Data Unit (MPDU) length field 932, a wireless video network ID (WVNID) field 933, a destination ID (DestID) field 934, a source ID (SrcID) field 935, a scrambler initialization field 936, a beam-tracking field 937, a reserved field 938, and a CRC field 939.

The LRP mode index field 931 is set to a reserved mode index value to indicate that the frame 900 is an omni-directional ACK. The LRP mode index field 931 may include 3 bits.

The MPDU length field 932 is used to indicate the length of the MPDU. In one embodiment, the MPDU length field 932 is used to indicate the status of a data packet that an ACK sender has received from an ACK receiver. In case of acknowledging multiple sub-packets of a data packet, the MPDU length field 932 can be used as a bitmap. In such a case, each bit in the bitmap can be used to indicate the status of one of the sub-packets. The MPDU length field 932 may include 12 bits. Thus, at most 12 sub-packets can be indicated.

The WVNID field 933 includes the identifier of a wireless system network. The WVNID field 933 allows the ACK receiver to identify a wireless system network. Thus, in the event of overlapping wireless system networks, wireless devices can easily determine to which wireless network an ACK signal is transmitted. The WVNID field 933 may include 8 bits.

The DestID field 934 is configured to indicate the destination of the ACK signal, i.e., the ACK receiver. This configuration allows devices other than the ACK receiver to ignore the ACK frame. The DestID field 934 may include 8 bits. In certain embodiments, the DestID field 934 may have a value indicative of "broadcast," i.e., no specific destination device.

The SrcID field 935 is set to the device ID of the ACK sender. The SrcID field 935 explicitly indicates the origin of the ACK signal. The SrcID field 935 may include 8 bits.

The scrambler initialization field 936 is configured to provide the initial state of a scrambler used to make noise random. The scrambler initialization field 936 may include 6 bits.

The beam-tracking field 937 includes data indicative of the status of beam-tracking of antenna elements of the ACK sender. The ACK sender may use a beam for transmitting an ACK signal. The status of the beam may change due to environmental changes. In the illustrated embodiment, the beam-tracking field 937 indicates whether the current status of the beam-tracking data is the same as the immediately previous status of the beam-tracking data. The beam-tracking field 937 may include 1 bit.

The reserved field 938 includes 2 bits. The field 939 is reserved for any additional data.

The CRC field 939 includes a checksum calculated from the LRP header, using a CRC-16 scheme. It will be appreciated that various CRC schemes can be adapted for the CRC field 939. The CRC field 939 may include 16 bits.

Figure 9C:
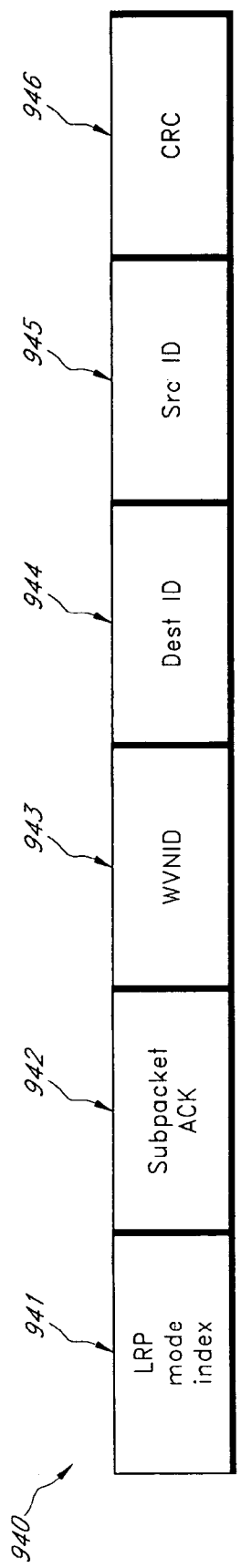
FIG. 9C is a timeline for the modified LRP header of FIG. 9A, according to another embodiment.

FIG. 9C illustrates another example of the modified LRP header 940. The LRP header 940 includes an LRP mode index field 941, a sub-packet ACK field 942, a WVNID field 943, a DestID field 944, a SrcID field 945, and a. CRC field 946. The modified LRP header 940 does not include an MPDU length field, a scrambler initialization field, a beam-tracking field, and a reserved field. The configurations of the LRP mode index field 941, the WVNID field 943, the DestID field 944, the SrcID field 945, and the CRC field 946 can be as described above with respect to those of the LRP mode index field 931, the WVNID field 933, the DestID field 934, the SrcID field 935, and the CRC field 939 of the modified LRP header 930 of FIG. 9B.

In the illustrated embodiment, the sub-packet ACK field 942 may include data indicative of the status of sub-packets in a data packet which the ACK sender has received from the ACK receiver. In one embodiment, the sub-packet ACK field 942 can include a plurality of bits, each indicative of a respective one of the sub-packets. In the illustrated embodiment, a data packet includes 5 sub-packets and the sub-packet ACK field 942 includes 5 bits, each indicative of the status of one of the sub-packets. It will be appreciated that the total number of bits in the sub-packet ACK field 942 can vary widely depending on the number of sub-packets in a data packet. It will also be appreciated that the number of bits in each of the fields can vary widely depending on the design of the ACK frame 900.

In the illustrated embodiments of FIGS. 9B and 9C, the WVNID field 933, 943, DestID field 934, 944, and SrcID field 935, 945 in the modified LRP header 930, 940 of the ACK signal 900 allow an ACK receiver to efficiently process the ACK signal 900. The ACK receiver can identify the source of the ACK by the WVNID 933, 943 and SrcID 935, 945. If any of the WVNID 933, 943, DestID 934, 944, and SrcID 935, 945 of the ACK signal 900, does not match information that the ACK receiver has, the ACK receiver can discard the ACK signal. In one embodiment, the ACK receiver is configured to compute a cyclic redundancy checksum only if both the WVNID 933, 943 and SrcID 935, 945 match the information which it has. In addition, processing of packets from other wirelessHD networks can be avoided. This configuration also enhances power saving for portable AV devices.

Figure 9D:
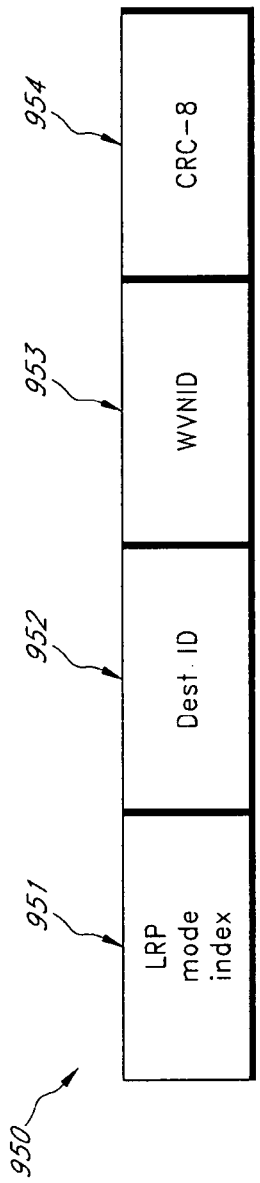
FIG. 9D is a timeline for the modified LRP header of FIG. 9A, according to another embodiment.

FIG. 9D illustrates yet another example of the modified LRP header 950. The LRP header 950 includes an LRP mode index field 951, a DestID field 952, a WVNID field 953, and a CRC field 954. The configurations of the LRP mode index field 951, the DestID field 952, the WVNID field 953, and the CRC field 954 can be as described above with respect to those of the LRP mode index field 931, the DestID field 934, the WVNID field 933, and the CRC field 939 of the modified LRP header 930 of FIG. 9B. In the illustrated embodiment, the CRC field 953 can use a CRC-8 scheme.

The WVNID field 953 and DestID field 952 in the modified LRP header 950 of the ACK signal 900 allow an ACK receiver to efficiently process the ACK signal 900. The ACK receiver can identify the source of the ACK by the DestID 952. If any of the WVNID 953 and DestID 952 of the ACK signal 900, does not match information that the ACK receiver has, the ACK receiver can discard the ACK signal. In one embodiment, the ACK receiver is configured to compute a cyclic redundancy checksum only if both the WVNID 953 and DestID 952 match the information which it has. In addition, processing of packets from other wireless HD networks can be avoided. This configuration also enhances power saving for portable AV devices.

Figure 10:
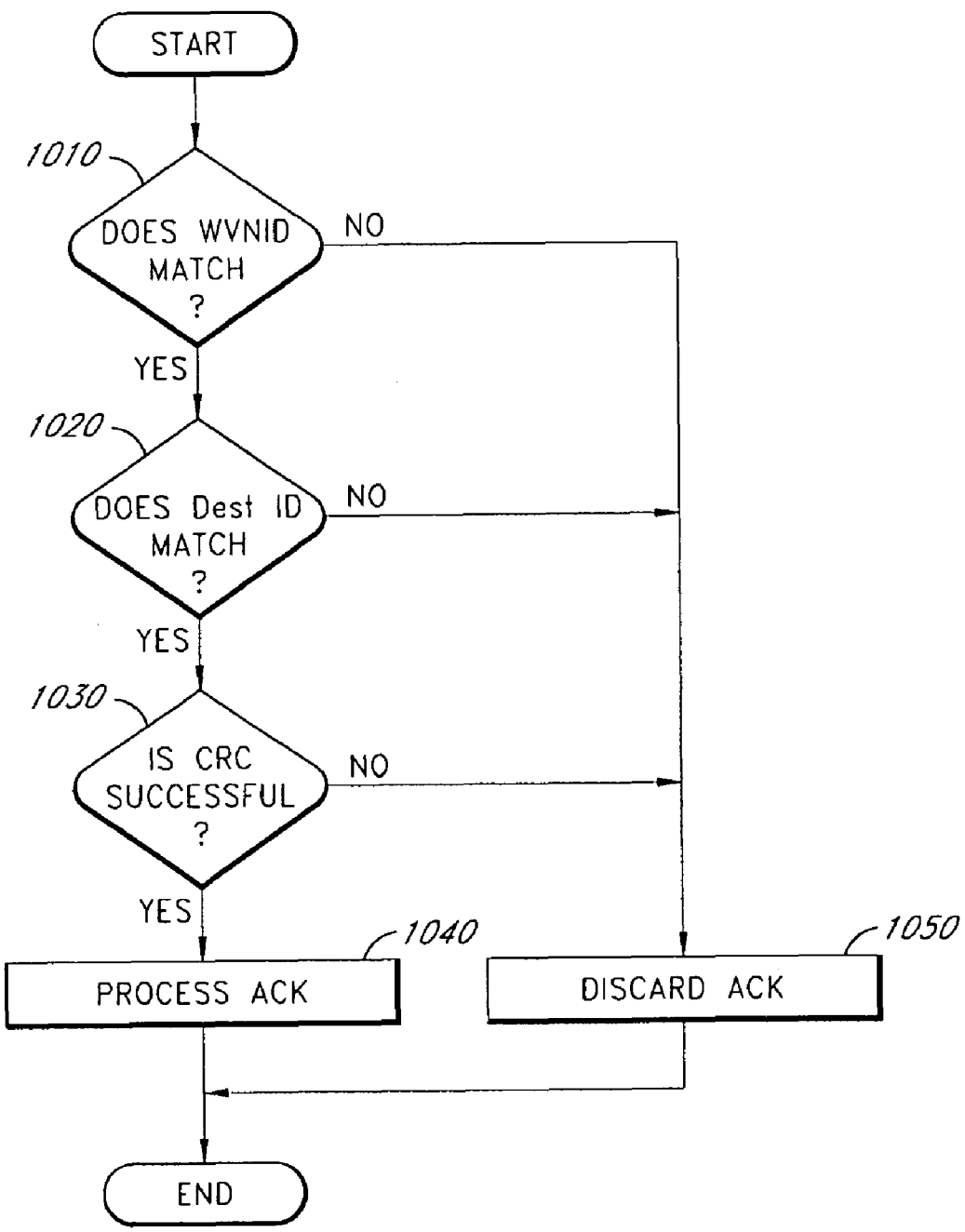
FIG. 10 is a flowchart illustrating a method of processing an ACK signal, according to one embodiment.

FIG. 10 is a flowchart illustrating a method of processing an ACK signal. In one embodiment, upon receiving a data packet from a video source device (a data packet sender), a video display device (a data packet receiver) may send an ACK signal to the video source device to acknowledge the receipt of the data packet.

In one embodiment, the ACK signal is the ACK signal 900 of FIG. 9A. As described above, the ACK signal 900 may include the WVNID 933, 943, the DestID 934, 944, and the SrcID 935, 945. In block 1010, upon receiving the ACK signal 900 from the video display device, the video source device determines whether the WVNID 933, 943 matches the one that it has. If the answer is "YES," the video source device then determines whether the DestID 934, 944 matches the one that it has in block 1020. If the answer is "YES" again, the video source device now calculates a CRC checksum in block 1030. Block 1030 serves to determine whether the video source device has received the ACK without an error. If the CRC checksum is successful, the video source device processes the ACK in block 1040, and may send another data packet to the video display device. In any of the blocks 1010, 1020, 1030, if the answer is "NO," the video source device can discard the ACK signal, and may stop sending another data packet to the video display device.

The foregoing description is that of embodiments of the invention and various changes, modifications, combinations and sub-combinations may be made without departing from the spirit and scope of the invention, as defined by the appended claims.

What is claimed is:

1. A wireless communication device for uncompressed video data, comprising:
    a receiver configured to receive a data packet via a channel during a reserved time slot or contention-free data period; and
    a transmitter configured to send an acknowledgment (ACK) frame during the slot period via a low-rate channel upon receiving the data packet, the low-rate channel having a directional mode and an omni-directional mode, the (ACK) frame comprising:
        a low-rate physical layer (LRP) preamble; and
        an ACK header comprising a mode index field, the mode index field comprising a plurality of bits indicative of whether the ACK frame is transmitted using the directional mode or the omni-directional mode, wherein the ACK header further comprises an ACK bitmap indicative of the status of the data packet, and wherein the data packet comprises a plurality of sub-packets, and wherein the ACK bitmap includes a plurality of bits, each of the ACK bitmap bits being indicative of the status of one of the sub-packets,
    wherein the ACK frame includes neither information indicative of a source address nor information indicative of a destination address, and
    wherein the ACK frame does not include a media access control (MAC) header.

2. The device of claim 1, wherein the plurality of bits is made up of 3 bits.

3. The device of claim 1, wherein the LRP preamble is a short LRP preamble which lasts about 2 μs to about 10 μs.

4. The device of claim 1, wherein the LRP preamble is a long LRP preamble which lasts about 30 μs to about 70 μs.

5. The device of claim 4, wherein the LRP preamble comprises one or more fields selected from: automatic gain control, signal detect, coarse frequency offset compensation, fine frequency offset compensation, timing recovery, receive diversity training, and channel estimation.

6. The device of claim 1, wherein the ACK header further comprises a CRC field.

7. The device of claim 1, wherein the receiver is configured to receive the data packet via one of a high-rate channel and a low-rate channel.

8. The device of claim 1, wherein the device is configured to use time division duplexing (TDD).

9. The device of claim 1, wherein the device is configured to use frequency division duplexing (FDD).

10. The device of claim 1, wherein the transmitter comprises a physical layer, the physical layer being configured to generate the ACK frame.

11. The device of claim 1, wherein the ACK frame does not include data indicative of a network to which the wireless communication device belongs.

12. An audiovisual device, comprising:
the device of claim 1; and
electronic circuitry configured to process audiovisual data from a video data source.

13. A wireless communication device for uncompressed video data, comprising:
means for receiving a data packet over a channel during a reserved time slot or contention-free data period; and
means for sending an acknowledgment (ACK) frame during the slot or period via a low-rate channel upon receiving the data packet, the low-rate channel having a directional mode and an omni-directional mode, the ACK frame comprising:
a low-rate physical layer (LRP) preamble; and
an ACK header comprising a mode index field, the mode index field comprising a plurality of bits, the plurality of bits being indicative of whether the ACK frame is transmitted using the directional mode or the omni-directional mode, wherein the ACK header further comprises an ACK bitmap indicative of the status of the data packet, and wherein the data packet comprises a plurality of sub-packets, and wherein the ACK bitmap includes a plurality of bits, each of the ACK bitmap bits being indicative of the status of one of the sub-packets,
wherein the ACK frame includes neither information indicative of a source address nor information indicative of a destination address, and
wherein the ACK frame does not include a media access control (MAC) header.

14. A method of wireless communication for uncompressed video data, the method comprising:
receiving, by a receiver, a data packet over a channel during a reserved time slot or contention-free data period; and
sending, by a transmitter, an acknowledgment (ACK) frame during the time slot or period over a low-rate channel after receiving the data packet, the low-rate channel having a directional mode and an omni-directional mode, the ACK frame comprising:
a low-rate physical layer (LRP) preamble; and
an ACK header comprising a mode index field, the mode index field comprising a plurality of bits, the plurality of bits being indicative of whether the ACK frame is transmitted using the directional mode or the omni-directional mode, wherein the ACK header further comprises an ACK bitmap indicative of the status of the data packet, and wherein the data packet comprises a plurality of sub-packets, and wherein the ACK bitmap includes a plurality of bits, each of the ACK bitmap bits being indicative of the status of one of the sub-packets,
wherein the ACK frame includes neither information indicative of a source address nor information indicative of a destination address, and
wherein the ACK frame does not include a media access control (MAC) header.

15. The method of claim 14, wherein the plurality of bits is made up of 3 bits.

16. The method of claim 14, wherein the LRP preamble is a short LRP preamble which lasts about 2 µs to about 10 µs.

17. The method of claim 14, wherein the LRP preamble is a long LRP preamble which lasts about 30 µs to about 70 µs.

18. The method of claim 17, wherein the LRP preamble comprises one or more fields selected from: automatic gain control, signal detect, coarse frequency offset compensation, fine frequency offset compensation, timing recovery, receive diversity training, and channel estimation.

19. The method of claim 14, wherein the ACK header further comprises a CRC field.

20. The method of claim 14, wherein receiving the data packet comprises using one of a high-rate channel and a low-rate channel.

* * * * *